United States Patent
Siddiqi et al.

(10) Patent No.: US 9,325,842 B1
(45) Date of Patent: Apr. 26, 2016

(54) SYSTEMS AND METHODS FOR ASSOCIATING A STRING WITH A CONTENT ITEM

(71) Applicant: Google Inc., Mountain View, CA (US)

(72) Inventors: Sajid Siddiqi, Fremont, CA (US); Lewis Adam Denizen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 14/444,563

(22) Filed: Jul. 28, 2014

(51) Int. Cl.
*H04M 11/00* (2006.01)
*H04M 3/493* (2006.01)
*G06F 17/30* (2006.01)
*G06F 3/0482* (2013.01)

(52) U.S. Cl.
CPC ............ *H04M 3/4931* (2013.01); *G06F 3/0482* (2013.01); *G06F 17/30958* (2013.01); *G06F 17/30985* (2013.01)

(58) Field of Classification Search
CPC .......................... H04M 3/53325; H04M 3/493
USPC ........................................................ 379/88.18
See application file for complete search history.

(56) References Cited

U.S. PATENT DOCUMENTS

| | | | | |
|---|---|---|---|---|
| 8,345,835 B1 * | 1/2013 | Or-Bach | ............ | G06Q 30/0269 379/114.13 |
| 2010/0241664 A1 * | 9/2010 | LeVasseur | .......... | H04M 7/0036 707/779 |
| 2015/0281442 A1 * | 10/2015 | van Rensburg | ....... | H04M 3/493 379/88.01 |

OTHER PUBLICATIONS

About GetHuman—the ultimate customer information website, GetHuman.com, http://gethuman.com/about.html, Jul. 22, 2014.

* cited by examiner

*Primary Examiner* — Simon King
(74) *Attorney, Agent, or Firm* — Foley & Lardner LLP; John D. Lanza; James C. De Vellis

(57) ABSTRACT

Systems and methods for associating a string with a content item. A phone number of a content item provider may be extracted from a content item. The content item provider is contacted via the phone number and a connection to an automated system comprising a menu tree is verified. An endpoint of the automated system is determined and a string representing the phone number and the sequence of inputs required to reach the endpoint is generated and associated with the content item.

18 Claims, 8 Drawing Sheets

| Lookup Table 550 ||
|---|---|
| <pause>,1,1 | Place Order |
| <pause>,1,2 | Order Status |
| <pause>,1,3 | Cancel Order |
| <pause>,2 | Live Operator |
| <pause>,3 | Accounting Department |

FIG. 5B

SYSTEMS AND METHODS FOR ASSOCIATING A STRING WITH A CONTENT ITEM

BACKGROUND

In a computerized content delivery network, first-party content providers can provide information for presentation of resources, such as web pages, documents, applications, and/or other resources. Additional third-party content can also be provided for presentation on a client device together with the first-party content. Some third-party content may include contact information such as phone numbers. A user viewing the third-party content may desire to contact the third-party content provider using the contact information.

SUMMARY

One implementation of the present disclosure is a computer-implemented method for associating a string with a content item. The method may be performed by a processing circuit. The method includes obtaining, from a content item, a phone number of a content item provider. The content item provider is contacted via the phone number and a connection to an automated system comprising a menu tree is verified. An endpoint of the automated system is determined and a string representing the phone number and the sequence of inputs required to reach the endpoint is generated and associated with the content item.

Another implementation of the present disclosure is a system for associating a string with a content item. The system includes one or more processors. The system further includes an extractor obtaining, from a content item, a phone number of a content item provider. A caller contacts the content item provider via the phone number. A call verifier may verify a connection to an automated system comprising a menu tree. An endpoint detector determines an endpoint of the automated system. A string generator generates a string representing the phone number and a sequence of inputs required to reach the endpoint. A linker associates the generated string with the content item.

BRIEF DESCRIPTION OF THE DRAWINGS

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

The details of one or more implementations are set forth in the accompanying drawings and the description below. Other features, aspects, and advantages of the disclosure will become apparent from the description, the drawings, and the claims, in which:

FIG. 5B is a block diagram illustrating one embodiment of a lookup table structure;

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatus, and systems for providing information on a computer network. The various concepts introduced above and discussed in greater detail below may be implemented in any of numerous ways, as the described concepts are not limited to any particular manner of implementation. Specific implementations and applications are provided primarily for illustrative purposes.

Figure 1:
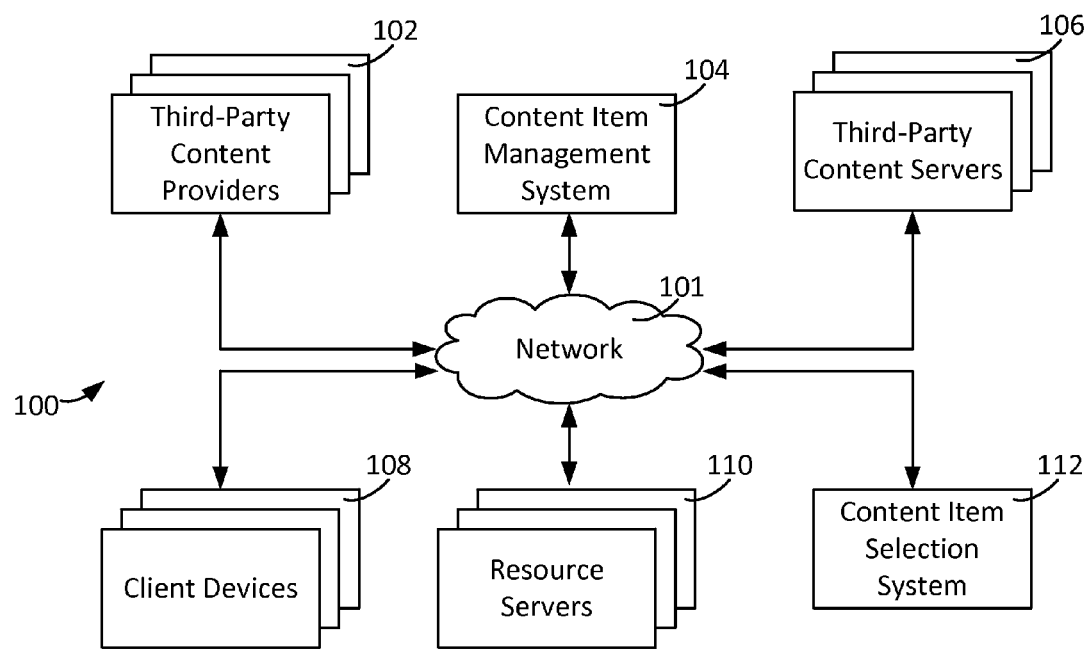
FIG. 1 is a block diagram of a computer system including a network, third-party content provider, content item management system, third-party content server, client devices, resource servers, and content item selection system, according to a described implementation.

FIG. 1 is a block diagram of a computer system 100 including a network 101, third-party content providers 102, content item management system 104, third-party content servers 106, client devices 108, resource servers 110, and content item selection system 112. The system 100 may be used to associate a string with a content item.

The system 100 may use at least one computer network 101. The network 101 may include a local area network (LAN), wide area network (WAN), a telephone network, such as the Public Switched Telephone Network (PSTN), an cellular network, a wireless link, an intranet, the Internet, or combinations thereof.

A third-party content provider 102 may be a computing device operated by an advertiser or any other content provider. The computing device can be a data processing system or have a data processor. The third-party content provider 102 may communicate with and provide a content item to the content item management system 104. In some implementations, the third-party content provider 102 may connect with the content item management system 104 to manage the selection and serving of content items by content item selection system 112. For instance, the third-party content provider 102 may set bid values and/or selection criteria via an interface that may include one or more content item conditions or constraints regarding the serving of content items. A third-party content provider 102 may specify that a content item and/or a set of content items should be selected for and served to client devices 108 having device identifiers associated with a certain geographic location or region, a certain language, a certain operating system, a certain web browser, etc. In another implementation, the third-party content provider 102 may specify that a content item or set of content items should be selected and served when a resource, such as a web page, document, an application, etc., includes content item that matches or is related to certain keywords, phrases, etc. The third-party content provider 102 may set a single bid value for several content items, set bid values for subsets of content items, and/or set bid values for each content item. The third-party content provider 102 may also set the types of bid values, such as bids based on whether a user clicks on the third-party content item, whether a user performs a specific action based on the presentation of the third-party content item, whether the third-party content item is selected and served, and/or other types of bids.

The content item may be provided by the third-party content provider 102 to the content item management system 104. The content item may be in any format or type that may be presented on a client device 108. The content item may also be a combination or hybrid of the formats. The content item may be specified as one of different format or type, such as text, image, audio, video, multimedia, etc. The content item 405 may be a banner content item, interstitial content item, pop-up content item, rich media content item, hybrid content item, Flash® content item, cross-domain iframe content item, etc. embedded information such as hyperlinks, metadata, links, machine-executable instructions, annotations, etc. The content item may indicate a URL that specifies a web page or a resource to which the client device 108 will be redirected. The content item may include embedded instructions, and/or machine-executable code instructions. The instructions may be executed by the web browser when the content item is displayed on the client device 108.

The third-party content provider 102 may provide contact information along with the content item. In some implementations, the contact information may be included or associated with the content item. Contact information may be a phone number, instant messaging handle, or any other contact information that allows interaction between the client device 108 and the third-party content provider 102.

A content item management system 104 can be a data processing system. The content item management system 104 can include at least one logic device, such as a computing device having a data processor, to communicate via the network 101, for instance with the third-party content providers 102, the third-party content servers 106, and the content item selection system 112. The content item management system 104 may be combined with or include one or more of the third-party content servers 106, the content item selection system 112, or the resource server 110. The one or more processors may be configured to execute instructions stored in a memory device to perform one or more operations described herein. In other words, the one or more data processors and the memory device of the content item management system 104 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, ECMAScript®, Perl®, Hypertext Markup Language (HTML), Extensible Markup Language (XML), Python®, and Visual Basic®. In addition to the processing circuit, the content item management system 110 may include one or more databases configured to store data. A data storage device may be connected to the content item management system 104 through the network 101.

The content item management system 104 may receive the content item from one or more third-party content providers 102. The content item management system 104 may store the content item in the memory and/or the one or more databases. The content item management system 104 may provide the content item to the third-party content server 106 via the network 101. In operation, the content item management system 104 may associate a string with a content item. The content item management system 104 is described in greater detail in relation to FIGS. 4A and 4B.

The third-party content server 106 can include a computing device configured to store content items. The third-party content server 106 may be a computer server (e.g., a file transfer protocol (FTP) server, a file sharing server, a web server, a database server, etc.), a group or a combination of servers (e.g., a data center, a cloud computing platform, a server farm, etc.). The content server 106 may be any type of a computing device that includes a memory element configured to store content items and associated data. The third-party content servers 106 may include any type of non-volatile memory, media, or memory devices. For instance, third-party content servers 106 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, third-party content servers 106 are local to content item management system 104, content item selection system 112, or resource server 110. In other implementations, third-party content servers 106 are remote data storage devices connected with content item management system 104 and/or content item selection system 112 via network 101. In some implementations, third-party content servers 106 are part of a data storage server or system capable of receiving and responding to queries from content item management system 104 and/or content item selection system 112. In some instances, the third-party content servers 106 may be integrated into the content item management system 104 or the content item selection system 112.

The third-party content server 106 may receive content items from the third-party content provider 102 or from the content item management system 104. The third-party content server 106 may store a plurality of third-party content items that are from one or more third-party content providers 102. The third-party content server 106 may provide content items to the content item management system 104, client devices 108, resource servers 110, content item selection system 112, and/or to other computing devices via network 101. In some implementations, the client devices 108, resource servers 110, and content item selection system 112 may request content items stored in the third-party content servers 106. The third-party content server 106 may store a content item with information identifying the third-party content provider, identifier of a set of content items, bid values, budgets, other information used by the content item selection system 112, impressions, clicks, and other performance metrics. The third-party content server 106 may further store one or more of client profile data, client device profile data, accounting data, or any other type of data used by content item management system 104 or the content item selection system 112.

The client device 108 may include any number and/or type of user-operable electronic device. For instance, a client device 108 may include a desktop computer, laptop, smart phone, wearable device, smart watch, tablet, personal digital assistant, set-top box for a television set, smart television, gaming console device, mobile communication device, remote workstation, client terminal, entertainment console, or any other device configured to communicate with other devices via the network 101. The client device 108 may be capable of receiving a resource from a resource server 110 and/or a content item from the content item selection system 112, the third-party content server 106, and/or the resource servers 110. The client device 108 may be any form of electronic device that includes a data processor and a memory. The memory may store machine instructions that, when executed by a processor, cause the processor to request a resource, load the resource, and request a content item. The memory may also store data to effect presentation of one or more resources, content items, etc. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, ECMAScript®, Perl®, Python®, Visual Basic®, and XML. The client device 108 may include an interface element (e.g., an electronic display, a touch screen, a speaker, a keyboard, a pointing device, a mouse, a microphone, a printer, a gamepad, etc.) for presenting content to a user, receiving user input, or facilitating user interaction with electronic content (e.g., clicking on a content item, hovering over a content item, etc.).

The client device 108 can request, retrieve, and display resources and content items. The client device 108 can execute a software application (e.g., a web browser, a video game, a chat program, a mobile application, or other application) to request and retrieve resources and contents from the resource server 110 and/or other computing devices over network 101. Such an application may be configured to retrieve resources and first-party content from a resource server 110. The first-party content can include text, image, animation, video, and/or audio information. In some cases, an application running on the client device 108 may itself be first-party content (e.g., a game, a media player, etc.). The first-party content can contain third-party content or require the client device 108 to request a third-party content from a third-party content server 106. The client device 108 may display the retrieved third-party content by itself or with the resources or the first-party content on the user interface element. In some implementations, the client device 108 includes an application (e.g., a web browser, a resource renderer, etc.) for converting electronic content into a user-comprehensible format (e.g., visual, aural, graphical, etc.).

The client device 108 may execute a web browser application to request, retrieve and display first-party resources and content items. The web browser application may provide a browser window on a display of the client device 108. The web browser application may receive an input or a selection of a URL, such as a web address, from the user interface element or from a memory element. In response, one or more processors of the client device 108 executing the instructions from the web browser application may request data from another device connected to the network 101 referred to by the URL address (e.g., a resource server 110). The computing device receiving the request may then provide web page data and/or other data to the client device 108, which causes visual indicia to be displayed by the user interface element of the client device 108. Accordingly, the browser window displays the retrieved first-party content, such as a web page from a website, to facilitate user interaction with the first-party content. The client device 108 and/or the agent may function as a user agent for allowing a user to view HTML encoded content.

The web browser on the client device 108 may also load third-party content along with the first-party content in the browser window. Third-party content may be a third-party content item. In some instances, the third-party content may be included within the first-party resource or content. In other instances, the first-party resource may include one or more content item slots. Each of the content item slots may contain embedded information (e.g. meta information embedded in hyperlinks, etc.) or instructions to request, retrieve, and load third-party content items. The content item slot may be a iframe slot, an in-page slot, and/or a JavaScript® slot. The web browser may process embedded information and execute embedded instructions. The web browser may present a retrieved third-party content item within a corresponding content item slot.

In some implementations, the client device 108 may detect an interaction with a content item. An interaction with a content item may include displaying the content item, hovering over the content item, clicking on the content item, viewing source information for the content item, or any other type of interaction between the client device 108 and a content item. Interaction with a content item does not require explicit action by a user with respect to a particular content item. In some implementations, an impression (e.g., displaying or presenting the content item) may qualify as an interaction. The criteria for defining which inputs or outputs (e.g., active or passive) qualify as an interaction may be determined on an individual basis (e.g., for each content item) by content item selection system 112 or by content item management system 104.

The client device 108 may generate a variety of user actions responsive to detecting an interaction with a content item. The generated user action may include a plurality of attributes including a content identifier (e.g., a content ID or signature element), a device identifier, a referring URL identifier, a timestamp, or any other attributes describing the interaction. The client device 108 may generate user actions when particular actions are performed by a client device 108 (e.g., resource views, online purchases, search queries submitted, etc.). The user actions generated by the client device 108 may be communicated to a content item management system 104 or a separate accounting system.

The resource server 110 can include a computing device, such as a database server, configured to store resources and content items. A computing device may be a computer server (e.g., a file transfer protocol (FTP) server, a file sharing server, a web server, a database server, etc.), a group or a combination of servers (e.g., a data center, a cloud computing platform, a server farm, etc.). The resource server 110 may be any type of a computing device that includes a memory element configured to store resources, content items, and associated data. The third-party content servers 106 may include any type of non-volatile memory, media, or memory devices. For instance, the resource server 110 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks.

The resource server 110 may be configured to host resources. Resources may include any type of information or data structure that can be provided over network 101. Resources provided by the resource server 110 may be categorized as local resources, intranet resources, Internet resources, or other network resources. Resources may be identified by a resource address associated with the resource server 110 (e.g., a URL). Resources may include web pages (e.g., HTML web pages, PHP web pages, etc.), word processing documents, portable document format (PDF) documents, text documents, images, music, video, graphics, programming elements, interactive content, streaming video/audio sources, comment threads, search results, information feeds, or other types of electronic information. In some implementations, one resource server 110 may host a publisher web page or a search engine and another resource server 110 may host a landing page, which is a web page indicated by a URL provided by the third-party content provider 102.

Resources hosted by the resource server 110 may include a content item slot, and when the client device 108 loads the resource, the content item slot may instruct the client device 108 to request a content item from a content item selection system 112. In some implementations, the request may be part of a web page or other resource (such as, for instance, an application) that includes one or more content item slots in which a selected and served third-party content item may be displayed. The code within the web page or other resource may be in JavaScript®, ECMAScript®, HTML, etc, and define a content item slot. The code may include instructions to request a third-party content item from the content item selection system 112 to be presented with the web page. In some implementations, the code may include an image request having a content item request URL that may include one or more parameters (e.g., /page/contentitem?devid=abc123&devnfo=A34r0). Such parameters may, in some implementations, be encoded strings such as "devid=abc123" and/or "devnfo=A34r0."

The content item selection system 112 can include at least one logic device, such as a computing device having a data processor, to communicate via the network 101, for instance with a third-party content provider 102, the content item management system 104, the third-party content server 106, the client device 108, and the resource server 110. In some implementations, the content item selection system 112 may be combined with or include the third-party content servers 106, the content item management system 112, or the resource server 110.

The content item selection system 112, in executing an online auction, can receive, via the network 101, a request for a content item. The received request may be sent from a resource server 110, a client device 108, or any other computing device in the system 100. The received request may include instructions for the content item selection system 112 to provide a content item with the resource. The received request can include client device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords associated with the requested resource, text of the content of the resource, a title of the resource, a category of the resource, a type of the resource, etc.). The information that the content item selection system 112 receives can include a HyperText Transfer Protocol (HTTP) cookie which contains a device identifier (e.g., a random number) that represents the client device 108. In some implementations, the device information and/or the resource information may be appended to a content item request URL (e.g., contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 112 to select third-party content items to be served with the requested resource and presented on a display of a client device 108. The selected content item may be marked as eligible to participate in an online auction.

Content item selection system 112, in response to receiving the request, may select and serve third-party content items for presentation with resources provided by the resource servers 110 via the Internet or other network. The content item selection system 112 may be controlled or otherwise influenced by a third-party content provider 102 that utilizes a content item management system 104. For instance, a third-party content provider 102 may specify selection criteria (such as keywords) and corresponding bid values that are used in the selection of the third-party content items. The bid values may be utilized by the content item selection system 112 in an auction to select and serve content items for presentation with a resource. For instance, a third-party content provider may place a bid in the auction that corresponds to an agreement to pay a certain amount of money if a user interacts with the provider's content item (e.g., the provider agrees to pay $3 if a user clicks on the provider's content item). In other instances, a third-party content provider 102 may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system 112 uses content item interaction data to determine the performance of the third-party content provider's content items. For instance, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some implementations, content item selection system 112 may determine one or more performance metrics for the third-party content items and the content item management system 104 may provide indications of such performance metrics to the third-party content provider 102 via a user interface. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. In some instances, the performance metrics may include a cost per engagement (CPE), where an engagement may be counted when a user interacts with the content item in a specified way. An engagement can be sharing a link to the content item on a social networking site, submitting an email address, taking a survey, or watching a video to completion. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used. The various performance metrics may be measured before, during, or after content item selection, content item presentation, user click, or user engagement.

The content item selection system 112 may select a third-party content item to serve with the resource based on performance metrics and/or several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system 112 through an auction.

During the auction for a content item slot for a resource, content item selection system 112 may utilize several different types of bid values specified by third-party content providers 102 for various third-party content items. For instance, an auction may include bids based on whether a user clicks on the third-party content item, whether a user performs a specific action based on the presentation of the third-party content item, whether the third-party content item is selected and served, and/or other types of bids. For instance, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For instance, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or an normalized value, may be generated to be used in the auction based on the bid value and the probability or another modifying value. In the prior instance, the value or score for a bid based on whether the third-party content item is selected and served may be $0.005*1.00=0.005 and the value or score for a bid based on whether a user performs a specific action may be $5*0.002=0.01. To maximize the income generated, the content item selection system 112 may select the third-party content item with the highest value from the auction. In the foregoing instance, the content item selection system 112 may select the content item associated with the bid based on whether the user performs the specific action due to the higher value or score associated with that bid.

Once the content item selection system 112 selects a third-party content item, data to effect presentation of the third-party content item on a display of the client device 108 may be provided to the client device 108 using a network 101. The contact information provided by the third-party content provider 102 may also be provided to and presented on the client device 108. In some implementations, a string generated from the contact information may be provided with the content item. The contact information or the string generated from the contact information may be used by the user on the client device 108 to contact the third-party content provider. For instance, a phone number may be provided with the content item and the user may call the phone number. In other implementations, the user on the client device 108 may select or click on the provided third-party content item. In some instances, a URL associated with the third-party content item may reference another resource, such as a web page or a landing page. In other instances, the URL may reference back to the content item selection system 112, a third-party content server 106, a content item management system 104, or a click server as described below. The client device 108 may send a request using the URL, and one or more performance metrics are updated, such as a click-thru or engagement. The client device 108 is redirected to a resource, such as a web page or a landing page, that has been provided by a third-party content provider 102 along with the content item.

In some implementations, the content item selection system 112 can include a click server. The click server may measure, store, or update performance metrics associated with the content item and/or the third-party content provider 102. The click server may be part of the content item management system 104, content item selection system 112, or another computing device connected to the network 101. In some implementations, the click server receives a request from a client device 108 when the user interacts with the content item that the client device 108 receives from the content item selection system 112 or the third-party content server 106. For instance, a user on the client device 108 may interact with a content item by clicking the content item, and the user may be redirected to a click page stored on the click server. In some implementations, the click server receives a request from a client device 108 when the user uses the provided contact information to contact the click server. For instance, the user may call the phone number that is provided with the content item. After the click server receives a request, the click server may record an interaction with the content item. After recording the interaction, the click server may update a performance metric stored in the content item management system 104, the third-party content server 106, or the content item selection system 112, where the performance metric is associated with a content item that was loaded on the client device 108. For instance, the metric may be a user engagement with an advertisement. The click server may redirect the client device 108 to a resource that is stored in a resource server 110, wherein the resource may be the landing page that is indicated by the URL provided by the third-party content provider 102 and associated with the content item.

In an illustrative instance, a client device 108 using a web browser can browse to a web page provided by a web page publisher. The web page publisher may be the first-party content provider and the web page may be the first-party content. The web page can be provided by a resource server 110. The client device 108 loads the web page which contains a third-party content item, such as an ad. In some implementations, the resource server 110 may receive an ad from an ad server and provide the ad with the web page to a client device. 108 The ad server may be a third-party content server 106. In some implementations, the web page publisher may provide search engine results and the ads may be provided with the search results. In some implementations, the web page may contain a link that either directly or indirectly references an ad server. For instance, as a web browser on a client device loads the web page, the client device requests the ad and receives it from the ad server. The ad server receives the ad from an advertiser. The advertiser may be a third-party content provider 106. The advertiser may create or provide information to generate the ad. The ad may link to a landing page which can be another web page or resource. The link can be provided by the advertiser. The ad can also include advertiser's contact information. In some implementations, the ad may link to a click server that updates performance metrics associated with the ad and redirects the client device 108 to the landing page. In some implementations, the ad can include a contact information such as phone number, that may be dialed by the user of the client device 108. When the user dials the contact phone number, a performance metric may be updated and the user's call may be forwarded to the landing page.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content item from the content server that may be more relevant to the user. In addition, certain data may be treated (e.g., by content item selection system 112) in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by client devices 108, etc.) and used by content item selection system 112.

Figure 2:
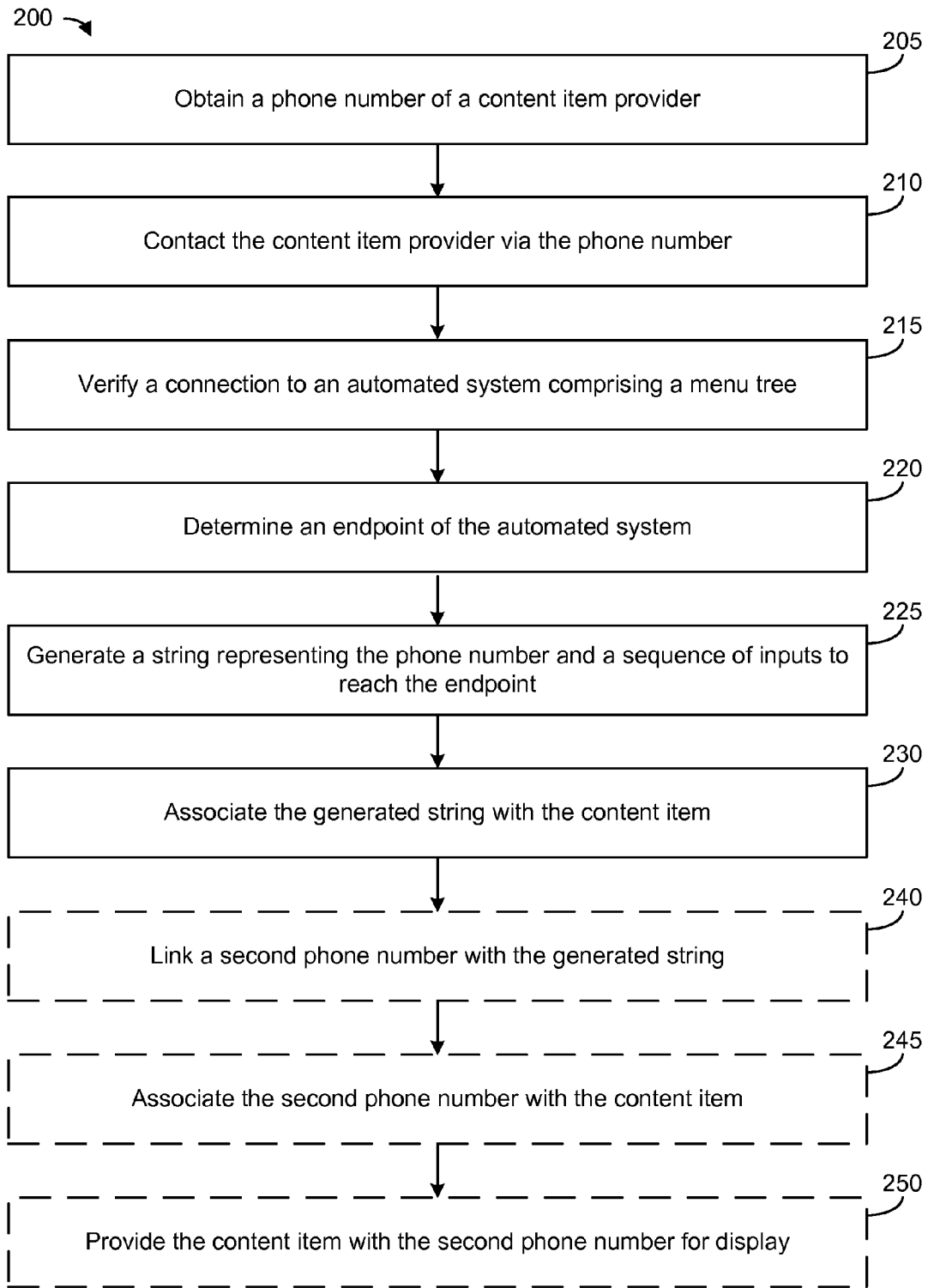
FIG. 2 depicts one implementation of a process for associating a string with a content item.

FIG. 2 depicts one implementation of a process for associating a string with a content item. In brief overview, the method generally includes obtaining a phone number of a content item provider (step 205), contacting the content item provider via the phone number (step 210), and verifying a connection to an automated system comprising a menu tree (step 215). The method further includes determining an endpoint of the automated system (step 220), generating a string representing the phone number and a sequence of inputs to reach the endpoint (step 225), and associating the generated string with the content item (step 230). The method may optionally include linking a second phone number with the generated string (step 240), associating the second phone number with the content item (step 245), and providing the content item with the second phone number for display (step 250).

Still referring to FIG. 2, and in more detail, the method includes obtaining a phone number of a content item provider (step 205). The phone number may be a sequence of digits that may be used to call or text message the content provider. The phone number may be received from a content provider with instructions to associate the phone number with content items provided by the content provider. The phone number may be received in association with a specific content item. The phone number may be extracted from a provided content item. The phone number may be obtained from a database of content items. The phone number may be obtained with an indication that the phone number presents an automated system, such as an interactive voice response (IVR), to a caller. The phone number may be obtained with an indication that the phone number presents a text menu when a text is sent to or received from the phone number. The phone number may be obtained with an indication that the phone number presents a group text messaging system. The phone number may be obtained with a request to associate a string with a corresponding content item, the string comprising a sequence of inputs to navigate the automated system. The phone number may be obtained with a request to associate a second phone number with the corresponding content item. The phone number may be obtained with a request to find and associate a string or a second phone number corresponding to a specific endpoint of the automated system. For instance, the request may specify that a string of inputs comprising a sequence of inputs to navigate to a "customer support" should be associated with the content item. In some implementations, the obtained phone number may be checked to be in valid format. For instance, in the United States and other countries that use the North American Numbering Plan, a telephone may comprise ten digits, where the first three digits are an area code. In some implementations, a telephone number may have a country code. For instance, a phone number in the United States may have a country code of one. In some implementations, the phone number may be a short code number that can be used for calling or text messaging.

As shown in FIG. 2, the method further includes contacting the content item provider via the phone number (step 210). In some implementations, a text message may be sent or received from the phone number. In some implementations, the phone number may be dialed via a Voice-over Internet Protocol (VoIP), PSTN, or cellular network. The phone number may be dialed over a network or a protocol capable of receiving dual-tone multi-frequency signals (DTMF). In some implementations, dialing the phone number may establish a connection over which an automated system is presented. In some implementations, a call may be terminated after an endpoint is found, so the phone number may be dialed multiple times until every endpoint of the automated system is found. In some implementations, the phone number may be dialed at different times and days. In some implementations, the phone number may be dialed to verify that the phone number exists. In some implementations, a text message may be sent to the phone number to verify that the phone number exists and can receive text messages.

As shown in FIG. 2, the method further includes verifying a connection to an automated system comprising a menu tree (step 215). When the phone number is dialed, an initial message is presented over the call. Speech recognition may be used on the initial message to convert the initial message to string format. Speech recognition may use hidden Markov models, neural networks, or other algorithms. In some implementations, the initial message may be saved as a sound recording file or as a string. In some implementations, text messaging the number may result in receiving a text message from the phone number. The sound recording file or string may be saved in association with the phone number. The sound recording file or string may be saved with an indication of the current date and/or time the call was made. The current date and/or time may include time of day, day of the week, and/or day and month. In some implementations, the sound recording file or the string may be compared with a previously stored sound recording file or string. The automated system may be verified if the sound recording file matches with the previously stored sound recording file, or if the string matches the previously stored string. In some implementations, semantic analysis of the initial message may determine whether the initial message presents a menu of an automated system. For instance, a semantic analysis of the initial message may determine that the initial message presents a menu with different options, such as "Thanks for calling our business. To speak with a customer representative, press one. To make a purchase, press two." A syntactic analysis may detect pauses, numbers, grammatical clauses and sentences and other grammatical structure of the initial message. The semantic and syntactic analysis may determine that the initial message is presenting a menu of an automated system. In some implementations, a semantic or syntactic analysis may reveal an optional menu, such as "For Spanish, press one." The initial menu may be determined to include a menu description and one or more options including option descriptions. A menu are described in greater detail in relation to FIG. 5A.

As shown in FIG. 2, the method further includes determining an endpoint of the automated system (step 220). In some implementations, dialing the phone number may immediately reach an endpoint. An indication of an endpoint may include a message indicating an endpoint, a menu option to navigate back to a previous menu, a menu option to be transferred to a specific department, a ringtone, a dial tone, or a live operator.

In some instances, the message of the menu may indicate an endpoint. For instance, the message may be "I'm sorry, this option is not available." The endpoint may be detected by semantically analyzing the message "I'm sorry, this option is not available." In some instances, the options of the menu may indicate an endpoint. A menu option to navigate back to a previous menu, for instance, may indicate an endpoint. For instance, for the message may be "We are open from 9 AM to 5 PM, Monday to Friday. Press 0 to return to the previous menu." The menu option "Press 0 to return to a previous menu" may indicate that the current menu may be an endpoint if there are no other menu options available. In some instances, a menu may automatically navigate to a previous menu, such as to the initial menu. For instance, the message of the menu may present some information, such as business hours, and navigate back to a previous menu. After a message of "Our business hours are from Monday to Friday 9 AM to 5 PM" the automated system may direct the call back to a previous menu. In some instance, the call is terminated after an endpoint is determined. A menu option to be transferred to another department may also indicate an endpoint. For instance, the message may be "Stay on the line to speak to the next available customer representative," "To be transferred to our sales team, press 0," or "To be transferred to our live operators, press 1."

In some instances, a ringtone may indicate an endpoint. A ringtone may indicate an endpoint because it may indicate that the call is transferred to a live operator or another department. Detecting a ringtone may include listening for a certain pitch, frequency, pattern, matching sounds, etc. In some instances, detecting a ringtone may include detecting elevator music or repeated messages that may be played when the caller is put on hold. In some instances, the endpoint may be detected when automated system terminates the call. For instance, an endpoint may be detected when the message is "This concludes the call. Goodbye." In other instances, an endpoint may be detected when a dial tone is detected, which is a signal that a call has been terminated. The dial tone may be detected via pitch, frequency, pattern, matching sounds, etc.

A live operator may indicate an endpoint. A live operator may be detected by analyzing various characteristics from a received speech. Characteristics that may be used to detect a live operator may include pauses, pitch variability, comparison to recordings, repeated patterns, and others. In some implementations, a machine-learning algorithm may be used to differentiate between a human voice and machine playback. The machine-learning algorithm may be, for instance, hidden Markov models, neural networks, statistical classifications, and other algorithms. In some implementations, machine-learning algorithms may be trained with one or more recordings of human operators and machine operators. In some implementations, the machine-learning algorithms may be trained as it detects endpoints. In some instances, method may include determining that no menu was presented and concluding that a live operator is on the line and/or waiting until the live operator terminates the call. In some implementations, a challenge question may be presented to verify the live operator. A challenge question may be an audio CAPTCHA (Completely Automated Public Turing test to tell Computers and Humans Apart). For instance, to detect a live operator, the method may include posing a playback of a question on the call. The question may ask to enter some sequence of numbers on the dial pad or to repeat a phrase to verify that the live operator is human.

Determining an endpoint of an automated system (step 220) may further comprise traversing through a menu tree. The automated system may comprise a menu tree that includes one or more menus. The menu tree may be navigated by selection a menu option of a menu sending an input. An input may be one of a DTMF signal, a sound recording, or a pause. In some implementations, determining an endpoint may comprise listening for an indication of an endpoint. In some implementations, a plurality of endpoints may be determined. In some implementations, the call is terminated after determining an endpoint. Determining an endpoint may include determining a sequence of inputs used to navigate the automated system to reach the endpoint. Determining an endpoint of the automated system is discussed in greater detail in relation to FIG. 3.

In some implementations, determining an endpoint of an automated system (step 220) may further comprise determining an endpoint description associated with the endpoint. The endpoint description may be a string describing the endpoint converted from a corresponding menu option or message of the automated system via speech recognition. For instance, the message may be "Press 0 to speak with a live operator." After speech recognition converts the message to a string, semantic and/or syntactic analysis of the string may assign "live operator" as the endpoint description. Semantic and/or syntactic analysis may include looking for one of a list of words or phrases, such as "live operator", or "place order," or etc. In some implementations, semantic and/or syntactic analysis may include parsing the string into grammatical parts and assigning a part of the grammatical part, such as a subject noun, as the endpoint description.

In implementations where the obtained phone number also includes a request for a specific endpoint, the endpoint description may include one or more of the strings included in the request. In some implementations, the endpoint description may be shortened based on a semantic and/or syntactic analysis of the endpoint description. The semantic and/or syntactic analysis may determine one or more words of the endpoint description that characterize the endpoint and/or are the most salient words. For instance, the endpoint description may be a string of "Press 1 to speak with a customer support representative," which may be shortened to "Customer Support." In some implementations, the semantic analysis may include looking for specific words in the endpoint description. For instance, semantic analysis may include looking for words or phrases "department," "business hours," "customer support," etc., that are stored as a list of words or phrases that are searched for in an endpoint description.

As shown in FIG. 2, the method further includes generating a string representing the phone number and a sequence of inputs to reach the endpoint (step 225). In some implementations, the string may be generated by appending the phone number with the sequence of inputs. The sequence of inputs may include one or more inputs ordered such as to navigate the automated system to the endpoint. If the sequence of inputs includes a pause, the generated string may include a special string that represents the pause. If the sequence of inputs includes a sound recording, the generated string may include a special string that indicates a sound recording and an identifier of the sound recording or a string that can be synthesized to a sound recording via speech synthesis. For instance, the special string may include the string "Yes" which may be synthesized to a sound recording of "Yes."

As shown in FIG. 2, the method further includes associating the generated string with the content item (step 230). An endpoint description of the generated string may be associated with the generated string and/or the content item. The endpoint description may be a string that describes the endpoint that was determined. The endpoint description and the generated string may be stored with the content item. For instance, the content item may include a reference, such as a pointer or a unique identifier, that points to or identifies the generated string. The content item may also be modified to directly include the generated string.

As shown in FIG. 2, the method optionally includes linking a second phone number with the generated string (step 240). The second phone number may be selected from a pool of available phone numbers. The pool of available phone numbers may include phone numbers that are currently not assigned or linked to other phone numbers. In some implementations, the pool of available phone numbers may be toll-free phone numbers. For instance, the pool of available phone numbers may include phone numbers with area codes of 800, 888, 877, 866, 855, and 844. In some implementations, available phone numbers may be a five digit short code phone number. In some implementations, the a module or a database may be queried that manages the pool of available phone numbers. The module or database may respond with an available phone number that may be used as the second phone number. The module or database may mark the available phone number as unavailable and remove it from the pool of available phone numbers. The module or database may store a list of unavailable phone numbers and store, with each unavailable phone number, an identifier that identifies which content item associated with the unavailable phone number.

Linking the second phone number with the generated string includes setting up a call forwarding module for the second phone number such that any calls to the second phone number will be forwarded to the generated string. Any calls made to the second phone number may update a performance metric associated with the content item, the second phone number, and/or the obtained phone number. In some implementations, any text messages to the second phone number will send one or more text messages comprising the sequence of inputs to the obtained phone number.

In some implementations, a plurality of second phone numbers may be linked with the generated string. A pool of available phone numbers may include phone numbers with different geographic and non-geographic area codes. A plurality of phone numbers with different area codes may be reserved from the pool of available phone numbers. A call forwarding module may be set up to forward each of the plurality of second phone numbers to the generated string. For instance, one of the linked second phone numbers may have an area code of "555" while another of the linked second phone number may have an area code of "800."

As shown in FIG. 2, the method optionally includes associating the second phone number with the content item (step 245). The second phone number may be stored with the content item. In some implementations, an endpoint description may be stored with the second phone number. In implementations where a plurality of endpoints are determined, each or some of the plurality of endpoints may be associated with the content item. In implementations where a plurality of second phone numbers are linked with the generated string, a description of each of the area code may be stored with each of the second phone numbers.

As shown in FIG. 2, the method optionally includes providing the content item with the second phone number for display (step 250). In some implementations, the method includes providing the content item with the generated string for display. The second phone number or the generated string may be provided as part of an online auction. The second phone number or the generated string may be provided to a client device for display with the associated content item and a resource such as a webpage. In some implementations, an endpoint description associated with the second phone number may be provided for display with the second phone number. In implementations where a plurality of second phone numbers are associated with the content item, one or more of the plurality of second phone numbers are selected for display on the client device. The one or more of the plurality of second phone numbers may be selected based on the geographic location of the client device.

Figure 3:
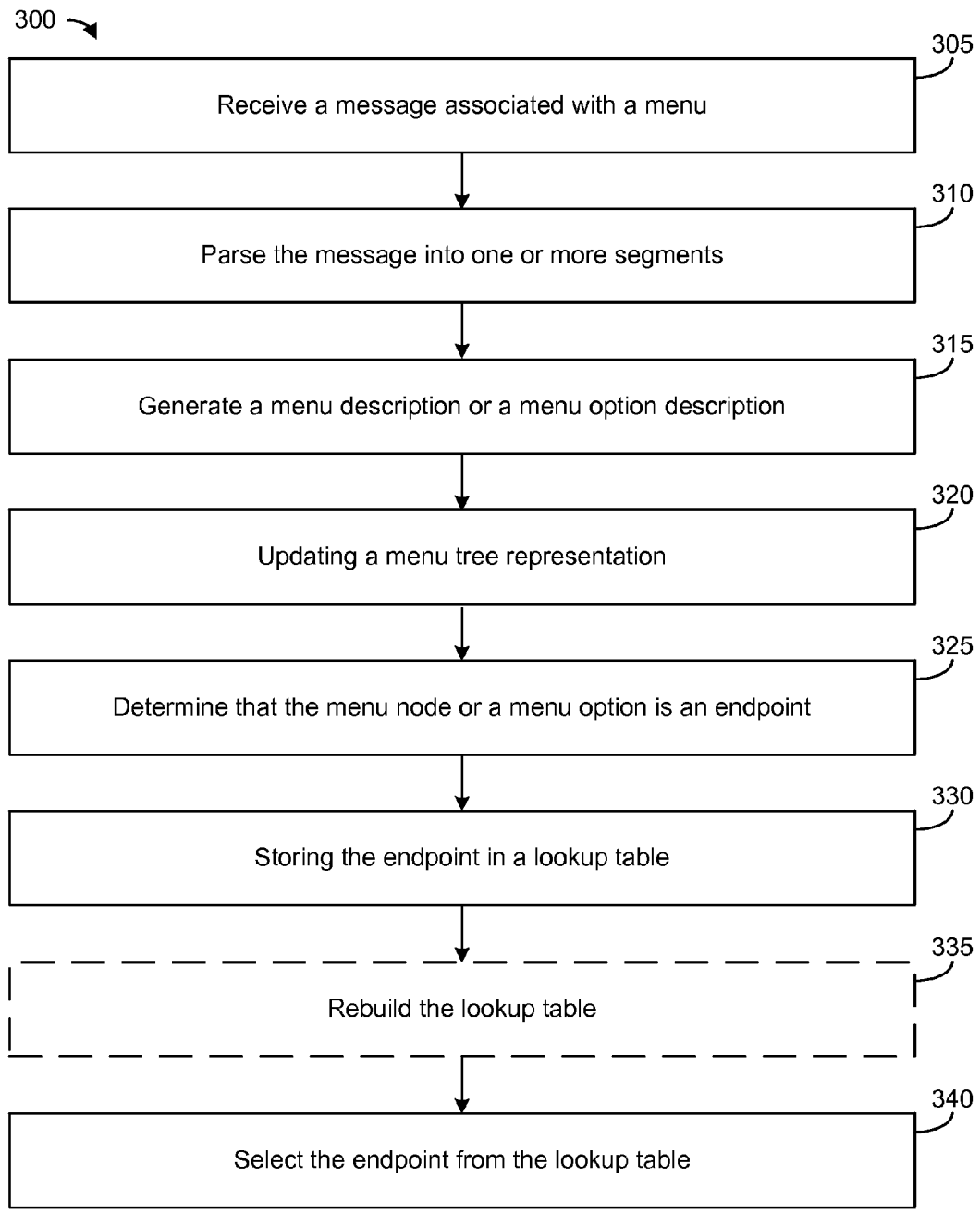
FIG. 3 depicts one implementation of a process for determining an endpoint of the automated system.

FIG. 3 depicts one implementation of determining an endpoint of the automated system. In brief overview, the method includes receiving a message associated with the menu (step 305), parsing the message into one or more segments (step 310), and generating a menu description or a menu option description (step 315). The method may also include adding a menu node to a representation of the menu tree (step 320), determining that the menu node or a menu option is an endpoint (step 325) and storing the endpoint in a lookup table (step 330). The may optionally include rebuilding the lookup table (step 335). The method may also include selecting the endpoint from the lookup table (step 340).

Still referring to FIG. 3, and in more detail, the method includes receiving a message associated with a menu (step 305). In some implementations, the received message may be a sound recording or an audio signal sent via a telephone call. In some implementations, the received message may be a text message. The received message may present a menu of the menu tree. The menu may be the initial menu, or any other menu of the menu tree. The menu may present a menu description and one or more menu options. In some instances, the menu description may include information about the content item provider, such as customer support hours. In some instances, the automated system may end the call after providing the message. In some instances, the automated system may forward the call to another menu after providing the message. In some instances, the automated system may pause for a selection of the option before forwarding the call to another menu, and the pause may be an input.

As shown in FIG. 3, the method includes parsing the message into one or more segments (step 310). In some implementations, the message may be parsed via speech recognition that converts the audio signal of the message to a string. In implementations where the received message is a text message, the text message may be a string. In some implementations, semantic and/or syntactic analysis may be used to parse the string. For instance, the string may be analyzed into one or more string segments, each representing a segment of the message. In some instances, one or more words may be specified that act as delimiters for the string. For instance, a string converted from the message may be "Select one of the following options. Press 1 for customer support. Press 2 for store hours." The string may be parsed by looking for the word "Press" followed by a number. The segment may be "Press 1 for customer support" and another segment may be "Press 2 for store hours." In another instance, a string may include the words "Press or say 1 for customer support," or "Say 1 for customer support." The string may be analyzed by finding "Press or say" or "Say" followed by a number. In some implementations, regular expression or other pattern matching rules may be used to find a menu option.

In some implementations, the message may be parsed into one or more segments via speech recognition directly. Different options may be detected from the audio signal by listening to different characteristics of the audio signal of the message. For instance, in the audio signal, there may be a bigger pause between options as compared to a pause between two words in the same option. In some implementations, both the audio signal analysis and the string converted from the audio signal may be parsed to find possible menu options.

As shown in FIG. 3, the method includes generating, from each segment, a menu description or a menu option description (step 315). A menu description may be a segment of the message that describes the menu. For instance, if the message is an audio signal of "Store hours are 9 AM to 5 PM, Monday through Friday," the menu description may be a string produced via speech recognition from the audio signal. In some implementations, the menu description may a menu option description of a previous menu that, when selected, navigates the call to the menu. A menu option description may be a segment of the message that describes the menu option. For instance, the message may be "Select one of the following options. Press 1 for customer support. Press 2 for store hours." One of the segment of the message may be the audio signal "Press 1 for customer support," and the corresponding menu option description may be a string of "Press 1 for customer support." In some implementations, parsing the message into one or more segments via a speech recognition module may generate one or more string segments that correspond to the segments. In other implementations, parsing the message into one or more segments via a speech comparison module may further require converting the segments into one or more corresponding string segments via a speech recognition module. The string segments may be classified as either a menu description or a menu option description based on semantic and/or syntactic analysis and/or a predefined rule set. For instance, a rule in the predefined rule set may specify that the first string segment may be a menu description, if it does not include a menu option based on the semantic and/or syntactic analysis of the first string segment. Otherwise, the rule may specify that the first string segment is a menu option description. Furthermore, another rule in the predefined rule set may specify that subsequent string segments may be menu descriptions. In some implementations, the menu description or the menu option description may be shortened, similar to how an endpoint description may be shortened as described in relation to step 220 of FIG. 2.

As shown in FIG. 3, the method includes updating a menu tree representation (step 320). The menu tree representation may be a tree data structure comprising one or more nodes that are linked together. Each node of the menu tree representation may be a menu node. Each menu node may include: 1) a menu description, and/or 2) one or more menu options with one or more corresponding menu option descriptions. The menu options may be associated with an input. For instance, a menu node may include a menu option description of "Press 2 for store hours," and an associated input of "2." In some implementations, adding a menu node to the representation of the menu tree may comprise updating a menu node that already exists in the tree data structure. For instance, when a new menu node is added to the tree data structure, another menu node corresponding to a previous menu may need to be updated such that a menu option of the other menu node points to a newly inserted menu node. For instance, a previous menu may include a menu option of "Press 2 for store hours," and the current menu may be "Store hours are 9 AM to 5 PM." A new menu node may be inserted into the tree data structure, and a menu node corresponding to the menu option "Press 2 for store hours" may be updated such that it points to the newly inserted menu node, which will be a child node. The menu tree representation is described in greater detail in relation to FIG. 5A.

As shown in FIG. 3, the method includes determining that the menu node or a menu option is an endpoint (step 325). In some implementations, the menu node may be determined to be an endpoint if call ends at the menu node or if the menu node only has an option to go back to a previous menu. In some implementations, the menu node may be determined to be an endpoint if the menu description confirms the end of the call or the text messages. As discussed in some detail in relation to step 220 of FIG. 2, in some implementations, the menu node may be determined to be an endpoint by analyzing the message associated with the menu node. For instance, the message may be "This ends the call. Goodbye." In some implementations, the menu node may be determined to be an endpoint when a specific tone or a signal is heard during the message or after the message. For instance, a ringtone may indicate that the call has been forwarded to a live operator. In some instances, a dial tone may indicate that the call has ended. In some implementations, a determination of an endpoint may require that the call be terminated. In some implementations, the menu node may be determined to be an endpoint when the call is picked up by a live operator, at which point the call may be terminated or a recorded message may be played to the live operator explaining the purpose of the call. In some implementations, machine-learning algorithms or a challenge question may be used to detect a live operator. In some implementations, a menu node may be determined to be an endpoint via an analysis of the menu tree representation. For instance, a menu node may have no selectable menu options, which may indicate that it is an endpoint. In another instance, a menu code may have one or more menu options that navigates the call to a previous menu after presenting a message. In some implementations, a menu node may be determined to be an endpoint when the menu asks for a caller-specific input. For instance, the menu may ask the caller to say or press an account number or an activation key. In some implementations, a menu option may be determined to be an endpoint. For instance, the semantic and/or syntactic analysis of the corresponding menu option description may determine that selecting the menu option will lead to connecting the call to a department such as customer support, a liver operator, terminating the call, input a caller-specific input, or any other endpoint. For instance, the menu option description may be "Press 2 for store hours." The endpoint may be determined from the semantic and/or syntactic analysis of the menu option description. In implementations where the automated system interacts via text messaging, the menu node may be determined to be an endpoint if no text messages are received after a predefined amount of time, the message indicates a termination of the interaction with the automated system, or a user-specific input is requested.

In some implementations, a plurality of endpoints may be determined. In some implementations, after an endpoint is determined, the method may include examining whether the menu tree has been fully mapped. A menu tree is fully built when every menu option of every menu node known to either be an endpoint or point to another menu node. In some implementations, if the content-item provider has specified which endpoint to find, one or more additional endpoints may be determined until the specified endpoint if found, by mapping out additional branches of the menu tree. In some implementations, a call may be terminated in the course of determining that a menu node or a menu option is an endpoint, before fully building the menu tree representation. In such implementations, the method includes redialing or re-texting the phone number, navigating to a menu node that includes a menu option that is not known to be an endpoint or point to another menu node, and continuing to build the menu tree representation by finding more menus and endpoints. In some implementations, the call may not have been terminated when determining that a menu or a menu option is an endpoint. For instance, a menu may informs the caller of the store hours and automatically navigate back to the previous menu. In such instances, other endpoints may be determined via the same call. The menu tree may be navigated by sending a sequence of inputs corresponding to each of the menu options at each menu. An input may be determined from a menu description or the menu option.

As shown in FIG. 3, the method includes storing the endpoint in a lookup table (step 330). A lookup table may be stored in an array or any other data structure capable of storing one or more entries, where each entry corresponds to an endpoint in the automated system. An entry may include a sequence of inputs required to navigate to the endpoint and an endpoint description. In some implementations where a menu node is determined to be an endpoint, the corresponding menu description may be the endpoint description. In some implementations where a menu option is determined to be an endpoint, the corresponding menu option description may be the endpoint description. In some implementations, the method may include storing a plurality of endpoints of the automated system in the lookup table. In some implementations, after the menu tree has been built fully, the menu tree may be traversed to find each endpoints. Traversing the menu tree may require algorithms known to the person having ordinary skill in the art. The lookup table is described in greater detail in relation to FIG. 5B.

As shown in FIG. 3, the method optionally include rebuilding the lookup table (step 335). Some content item providers may indicate that the automated system has been changed, which would change the sequence of inputs necessary to navigate to an endpoint. Some content item providers may change the automated system without informing the content item management system. Some changes to the automated system may change the sequence of inputs necessary to reach an endpoint. The entire menu tree may be rebuilt by repeating the process 200 for associating a string with a content item as described in relation to FIG. 2.

As shown in FIG. 3, the method includes selecting the endpoint from the lookup table (step 340). The lookup table may store one or more entries, each representing an endpoint of the automated system. One or more of the entries may be selected. Selection can be made based on endpoint descriptions. In some implementations, the selection can be made based on an endpoint description matching one of a list of keywords, such as "customer support." In some implementations, the selection can be made based on an input from the content item provider, the input specifying the endpoint to select. In some implementations, the selection can be made by the content item selection system, based on a client device to which the content item is served. For instance, the client device may specify a user identifier that has a higher interest in golf. If the content item provider is a sporting goods that has an automated system, and if one of the endpoints may be a live operator to a salesperson at the golf department, the content item selection system may select that endpoint.

Figure 4A:
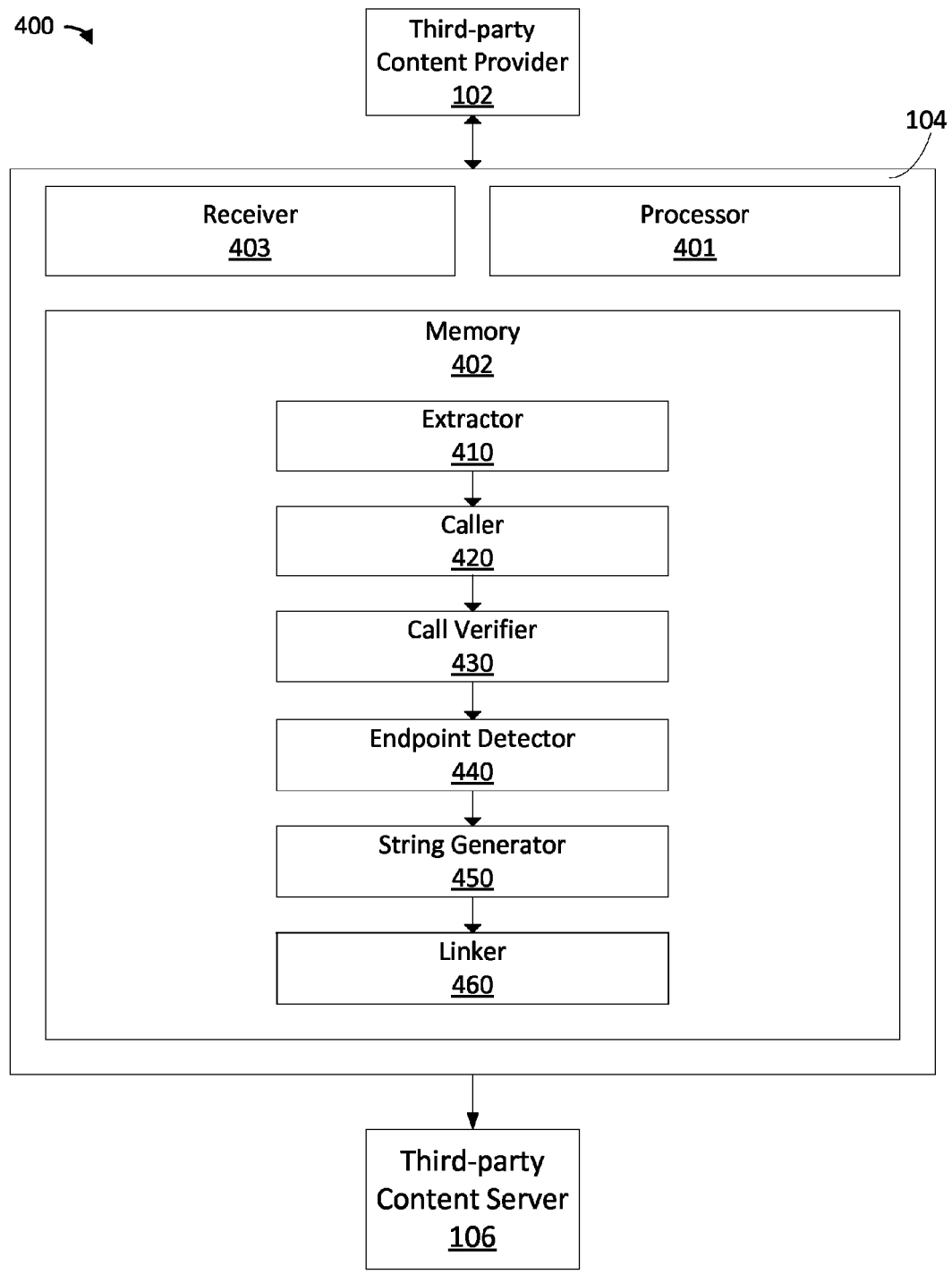
FIG. 4A is a block diagram illustrating one implementation of the content item management system of FIG. 1 in greater detail.

FIG. 4A is a block diagram illustrating one implementation of the content item management system of FIG. 1 in greater detail, shown to include a processor 401, memory 402, and receiver 403. The receiver 403 may be one or more communication interfaces that includes wired or wireless interfaces (e.g., jacks, antennas, transmitters, receivers, transceivers, wire terminals, Ethernet ports, WiFi transceivers, wireless chipset, air interface etc.) for conducting data communications with local or remote devices or systems via the network 101. For instance, the receiver 403 may allow the content item management system 104 to communicate with third-party content provider 102, third-party content server 106, resource server 110, and other components of computer system 100. In some implementations, the receiver may have a corresponding module or software that works in conjunction with hardware components. The receiver 403 may receive a content item from a third-party content provider 102 and transmit the received content item to the extractor 410. The receiver 403 may contact the third-party content provider 102 via a phone call or a text message.

The processor 401 may be implemented as a general purpose processor, an application specific integrated circuit (ASIC), one or more field programmable gate arrays (FPGAs), a CPU, a GPU, a group of processing components, or other suitable electronic processing components. The processor 401 may be connected directly or indirectly to the memory 402 and the receiver 403. The processor 401 may read, write, delete, or otherwise access data stored in memory 402 or other components. The processor 401 may execute instructions stored in memory 402.

Memory 402 may include one or more devices (e.g., RAM, ROM, flash memory, hard disk storage, etc.) for storing data and/or computer code for completing and/or facilitating the various processes, layers, and modules described in the present disclosure. Memory 402 may include volatile memory or non-volatile memory. Memory 402 may include database components, object code components, script components, or any other type of information structure for supporting the various activities and information structures described in the present disclosure. In some implementations, memory 402 is communicably connected to processor 401 and includes computer code (e.g., data modules stored in memory 402) for executing one or more processes described herein. In brief overview, memory 402 is shown to include an extractor 410, a caller 420, a call verifier 430, an endpoint detector 440, a string generator 450, and a linker 460.

Still referring to FIG. 4A, memory 402 is shown to include an extractor 410. The extractor 410 may receive a content item from the receiver 403. The extractor 410 may then obtain, from the content item, a phone number of a content item provider. In some implementations, the extractor 410 may extract the phone number from the content item which includes the phone number. In some implementations, the extractor 410 may receive the phone number in association with the content item. In some implementations, the extractor 410 may first receive the content item, and using an identifier of the content item, retrieve the phone number via the receiver 403 from the third-party content provider 102 or another computing device. The extractor 410 may obtain an indication that calling the phone number presents an automated system. The extractor 410 may receive a request to associate a string with the content item. In some implementations, the extractor 410 may check that the phone number is in a valid format. The phone number may be stored in memory 402.

As shown in FIG. 4A, memory is shown to include a caller 420. The caller may contact the content item provider via the phone number. The caller 420 may dial and call the phone number via the receiver 403. The caller 420 may call over VoIP, PSTN, or a cellular network via the receiver 403. The caller 420 may call over a network or a protocol capable of receiving DTMF signals. In some implementations, the caller 420 may be capable of sending DTMF signals over the network or the protocol via the receiver 403. In some implementations, the caller 420 may be capable of sending text messages to the phone number via the receiver 403. In some implementations, the caller 420 may contact the third-party content item provider 102 multiple times. In some implementations, the caller 420 may establish a connection to an automated system provided by the third-party content item provider 102. In some implementations, the caller 420 may check that the phone number is in a valid format.

As shown in FIG. 4A, memory is shown to include a call verifier 430. In some implementations, the call verifier 430 may be part of the caller 420. The call verifier 430 may verify that a connection was made to the third-party content provider 102 by the caller 420. In some implementations, the call verifier 430 verifies that a connection to an automated system was made by the caller 420. The automated system may be provided by the third-party content provider 102. The caller 420 may receive an initial message, and the call verifier 430 may analyze the initial message to verify the connection to the automated system. The call verifier 430 may analyze the initial message via a speech recognition module, which is discussed in greater detail in relation to FIG. 4B. In implementations where the caller 420 contacts the third-party content item provider 102 multiple times, the call verifier 430 may store the initial message during one of the times a connection is made, and compare the stored initial message to another time a connection is made. The call verifier 430 may verify a connection to an automated system via semantic and/or syntactic analysis of the initial message. In some implementations, the call verifier 430 may determine that the no automated system is presented. In some implementations, the call verifier 430 may call a function or in another way use the endpoint detector 440 to determine that no automated system is presented. The call verifier 430 may determine that no automated system is presented if the initial message is not part of an automated system. In such implementations, the call verifier 430 may store the current date and/or time.

As shown in FIG. 4A, memory is shown to include an endpoint detector 440. The endpoint detector 440 may receive one or more messages from the automated system via the receiver 403. The endpoint detector 430 may build a representation of the menu tree of the automated system in memory 402. The endpoint detector 440 may navigate the menu tree of the automate system by receiving one or more messages from the automated system and sending inputs to the automated system. The endpoint detector 440 may listen via the receiver 403 an indication of an endpoint, such as a ring tone, a live operator, a message indicating an endpoint, a menu option to be transferred to a specific department, a menu option to navigate back to a previous menu, or a dial tone. The endpoint detector 440 may determine a plurality of endpoints. After determining an endpoint, the endpoint detector 440 may terminate the call after determining an endpoint. In some implementations, the endpoint detector 440 may determine that the menu tree representation is incomplete and communicate with the caller to contact the third-party content provider 102 again. The endpoint detector 440 may also determine a sequence of inputs used to navigate the automated system to the determined endpoint.

In some implementations, the endpoint detector 440 may determine an endpoint description corresponding to the determined endpoint. The endpoint detector 440 may call a function or in another way use a speech recognition module to convert a message received from the automated system to a string. The string may be shortened and stored as an endpoint description in association with the endpoint. The endpoint, including the sequence of inputs and the endpoint description, may be stored in a data structure in memory 402, as described in greater detail in relation to FIG. 5B.

As shown in FIG. 4A, memory is shown to include a string generator 450. The string generator 450 may generate a string by combining a sequence of input with the phone number. The string generator 450 may append the sequence of input after the phone number. In implementations with multiple endpoints stored in memory 402, the string generator 450 may select one of the endpoints based on the endpoint descriptions. In some implementations, the string generator 450 may select an endpoint from a plurality of endpoints, based on an input from the third-party content item provider 102. For instance, the third-party content item provider 102 may specify that an endpoint relating to customer support should be selected. The sequence of inputs is discussed in greater detail in relation to FIG. 5B.

As shown in FIG. 4A, memory is shown to include a linker 460. The linker 460 may associate the string generated by the string generator 450 with the content item. The linker 460 may also associate the corresponding endpoint description with the content item. The linker 460 may store the endpoint description and the generated string with the content item. The linker 460 may send the content item that stores the endpoint description and the generated string to the third-party content server 106 or another computing device on the network. The content item selection system may select the content item and serve the content item to a client device, where it is displayed with the generated string, comprising the phone number and sequence of inputs.

Figure 4B:
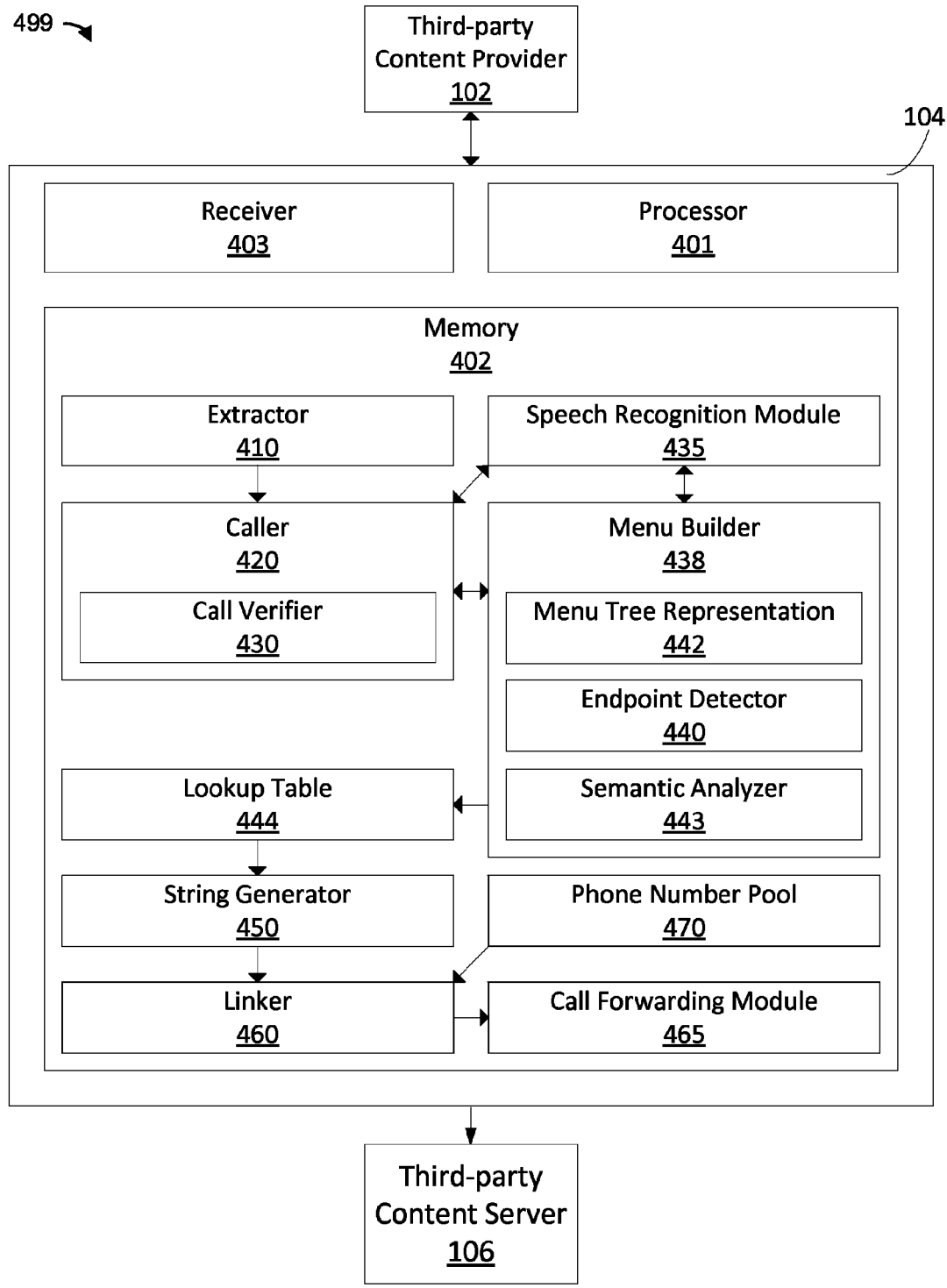
FIG. 4B is a block diagram illustrating another implementation of the content item management system of FIG. 1 in greater detail.

FIG. 4B is a block diagram illustrating another implementation of the content item management system of FIG. 1 in greater detail. The processor 401, memory 402, and receiver 403 are similar to the ones described in relation to FIG. 4A. The memory 402 may include an extractor 410, a caller 420 that includes a call verifier 430, a speech recognition module 435, a menu builder 438 that includes an endpoint detector 440, a menu tree representation 442, and a semantic analyzer 443, a lookup table 444, a string generator 450, a phone number pool 470, a linker 450, and a call forwarding module 465.

As shown in FIG. 4B, memory is shown to include an extractor 410, a caller 420, and a call verifier 430, which are similar to the ones described in relation to FIG. 4A. The caller 420 may include the call verifier 430. The call verifier 430 may use the endpoint detector 440 and/or the semantic analyzer 443 to determine whether an endpoint is presented immediately when the call is made. The call verifier 430 may use the speech recognition module 435 to determine whether to initial message is presented as part of an automated system. The caller 420 may note the current date and/or time the call is made.

The speech recognition module 435 may convert an input of audio signal to an output of a string that corresponds to the audio signal. In some implementations, the speech recognition module 435 may be an interface to a speech recognition server that is connected to a server. The speech recognition module 435 may use neural networks, hidden Markov models, or any other algorithms and techniques known in the art. The speech recognition module 435 may be used by the call verifier 430, the endpoint detector 440 or the semantic analyzer 443. The speech recognition module 435 may have been previously set up or trained with a plurality of audio data. In some implementations, the speech recognition module 435 may be trained with data set of messages from automated systems. In some implementations, the speech recognition module 435 may be modified whenever it is used, or continuously trained as it is used. In some implementations, the speech recognition module 435 may convert the audio signal to a string and call the semantic analyzer 443 with the string. The semantic analyzer 443 may modify the string, which is used to further train the speech recognition module. In some instances, the speech recognition module 435 or the semantic analyzer 443 may have a certainty value, which may determine whether the speech recognition module 435 is further trained with the modified string. The speech recognition module 435 may detect audio signals in one or more languages. For instance, the initial message may include "For Spanish, press 1" in Spanish.

As shown in FIG. 4B, memory is shown to include a menu builder 438, which includes an endpoint detector 440, a menu tree representation 442, and a semantic analyzer 443. The menu builder 438 may build the menu tree representation 442. The menu tree representation 442 may be a tree data structure as described in greater detail in relation to FIG. 5A. The semantic analyzer 443 may be used to analyze the semantic structure of a string. In general, the semantic analyzer 443 may include a syntactic analyzer that may be used to analyze the syntactic structure of a string.

The menu builder 438 builds the menu tree representation 442 by receiving a message and parsing the message into one or more segments. The menu builder 438 may receive a message from the automated system via the connection over the receiver, and the message may be associated with a menu of the menu tree. A menu may comprise a description and one or more menu options. The menu builder 438 may parse the message into one or more segments. In some implementations, the menu builder 438 may use the speech recognition module 435 to convert the message to a string. In some implementations, the menu builder 438 may receive the string that has already been converted. In implementations where the automated system sends a text message, the message does not need to be converted. The menu builder 438 may parse the string to one or more segments, each segment presenting a menu description or a menu option description. In some implementations, the menu builder 438 may receive from the speech recognition module 435 one or more segments, where the speech recognition module 435 may determine the one or more segments via the length of pause between two words or other audio signal analysis. The menu builder 438 may parse the message by using both the audio signal analysis of the speech recognition module 435 and the semantic analyzer 443.

The menu builder 438 may then generate, from each of the one or more segments, a corresponding menu description or a menu option description. The menu description and the menu option descriptions are strings. In some implementations, the speech recognition module 435 may have converted the entire message into a string, which may have been parsed to a menu description and/or one or more menu option descriptions. In some implementations, the speech recognition module 435 may have parsed the message into one or more segments, each of which are segments of audio signals. The speech recognition module 435 may then convert each of the segments into corresponding string segments, which may be classified as a menu description or a menu option description based on semantic and/or syntactic analysis and/or a predefined rule set.

The menu builder 438 may update the menu tree representation 442. The menu tree representation 442 may correspond to the menu tree of the automated system, and include includes one or more menu nodes. The menu tree representation 442 is discussed in greater detail in relation to FIG. 5A. The menu builder 438 may update the menu tree representation 442 by inserting a menu node, the menu include a menu description and/or one or more menu options and corresponding menu option descriptions. The menu builder 438 may update the menu tree 438 representation by updating a pointer reference to another node that points to the newly inserted menu node or to a pre-existing node.

In some implementations, the menu builder 438 may determine that the menu or a menu option is an endpoint. The menu builder 438 may use the endpoint detector 440, which may be similar to the one described in relation to the FIG. 4A. The endpoint detector 440 may receive one or more messages from the automate system via the receiver 430. The endpoint detector 440 may use the semantic analyzer 443 to determine whether the message is indicating an endpoint.

In some implementations, the menu builder 438 may determine, via the endpoint detector 440, a plurality of endpoints. The menu builder 438 may determine whether the menu tree representation 442 fully maps the menu tree. If the menu tree is not fully mapped, the menu builder 438 may continue determining additional endpoints and/or menu nodes. In some instances where the call is terminated when an endpoint is determined, the menu builder 438 may redial or re-text the third-party content provider 102. In other instance where the call is not terminated when the endpoint is determined, the menu builder 438 may continue determining additional endpoints via the same call. The menu builder 438 may navigate the automate system by sending one or more inputs corresponding to menu options via the connection over the receiver 403. Each input may correspond to a menu option and may be determined from the menu option description.

As shown in FIG. 4B, memory is shown to include a lookup table 444. The menu builder 438 may populate the lookup table 444 with one or more endpoints from the menu tree representation 442. The menu builder 438 may insert an entry into the lookup table 444 each time an endpoint if found. The lookup table 444 may include the current date and/or time that the call was made. The lookup table 444 is described in greater detail in relation to FIG. 5B.

As shown in FIG. 4B, memory is shown to include a string generator 450, which may be similar to the one described in relation to FIG. 4A. The string generator 450 may select an endpoint from the lookup table 444 and combine it to the obtained phone number. The string generator 450 may send the combined string to the linker 460.

As shown in FIG. 4B, memory is shown to include a phone number pool 470, which may be one or more second phone numbers that are available. The phone number pool 470 may be stored in a different computing device and/or a database on the network or in the content item management system 104. The phone number pool 470 may include a manager module that handles requests for phone numbers from the pool and requests to put a phone number into the pool.

As shown in FIG. 4B, memory is shown to include a linker 460, which may be similar to the one described in relation to FIG. 4A. In some implementations, the linker 460 may request for and receive a second phone number from the phone number pool 470. In some instances, the linker 460 may request a second phone number form the phone number pool 470 with a specific area code. In some implementations, the linker 460 may link the received second phone number from the phone number pool 470 with the content item and/or the generated string. In some implementations, the linker 460 may also set up the call forwarding module 465 with the second phone number, the associated generated string and the associated content item.

As shown in FIG. 4B, memory is shown to include a call forwarding module 465. The call forwarding module may be part of a click server, and/or the content item management system 104. When a content item selection system serves the content item to a client device, the content item may be displayed with the second phone number. The call forwarding module 465 may be configured by the linker 460 to receive calls and or text messages from client devices. The call forwarding module 465 may then updated one or more performance metrics of the associated content item. The call forwarding module 465 may contact the third-party content provider 102 via the generated string which includes the obtained phone number and the sequence of inputs required to reach an endpoint. The call forwarding module 465 then forwards the client device 108 that has contacted the call forwarding module 465 to the third-party content provider 102 that has been contacted. The client device 104 may skip navigating the automated menu because the call forwarding module 465 has navigated the automated system using the sequence of inputs.

Figure 5A:
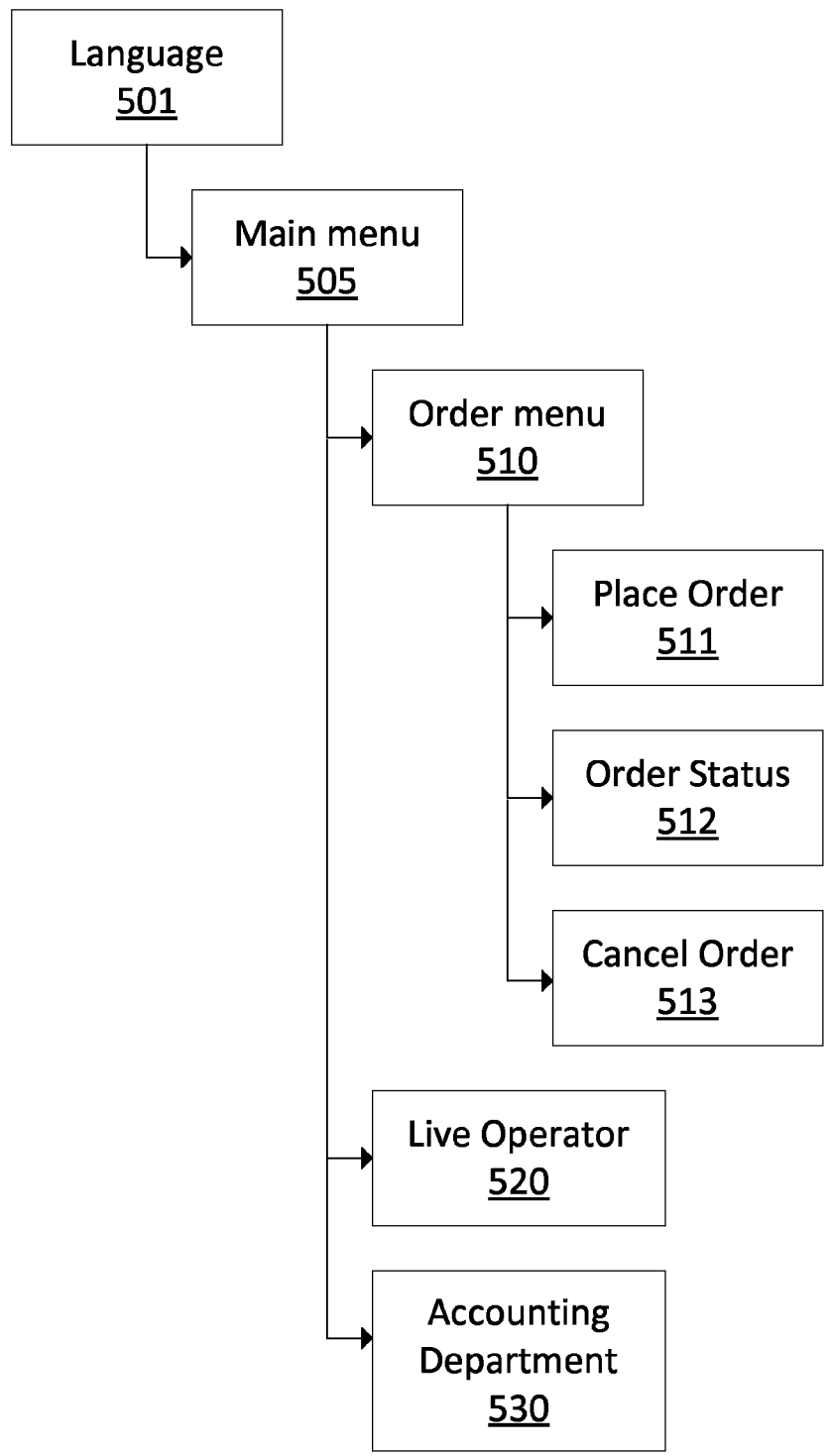
FIG. 5A is a block diagram illustrating one implementation of a data structure representing a menu tree.

FIG. 5A is a block diagram illustrating a structure representing a menu tree. The menu tree may represent the structure of the automated system, such as an IVR system. The menu tree may comprise of one or more menu node. Each menu node may include a menu description, which is a string that describes the menu node. Each menu node may also include one or more menu options. Each menu option may comprise an input and a menu option description. An input may be a DTMF signal, an audio-synthesized word or a recording, or a pause. Each menu option may include a reference to a menu node. The menu node or the menu option may be specified to be an endpoint. The menu tree may also include an initial menu node, which may correspond to the initial menu that will first be presented to a caller of IVR.

Further referring to FIG. 5A, the initial menu may be represented by the initial menu node Language 501. The automated system may send a message with the initial menu, the message comprising an audio signal or recording that says "For Spanish, press 1" in Spanish. The Language 501 menu node may include two menu options. The first menu option may include a menu option description of "Spanish," an input of 1 on the DTMF signal and a reference to a menu node (not shown in FIG. 5A) that is in Spanish. The second menu option may include a menu option description of "English," an input of pause (i.e. no DTMF signal), and a reference to the menu node of main menu 505.

Further referring to FIG. 5A, the main menu 505 may have the menu description of "main menu." The main menu 505 may include three menu options. The first menu option may include a menu option description of "To place an order, check the status of an order, or to cancel an order, press 1." The first menu option may include an input of 1, and a reference to the Order menu 510 menu node. The main menu 505 may also include a second menu option, which includes a menu option description of "To speak with a customer service representative, press 2." The second menu option may include an input of 2, and a reference to the endpoint Live Operator 520. The main menu 530 may also include a third menu option, which includes a menu option description of "To be forwarded to our accounting department, press 3." The third menu option may include an input of 3 and a reference to an endpoint which forwards the call to a different phone number, a different extension number, or a different department within the content item provider. In some implementations, the menu descriptions and/or the menu option descriptions may be shortened. Endpoints such as Live Operator 520 and Accounting Department 530 may be determined via semantic and/or syntactic analysis and/or navigating to the menu options by selecting the corresponding inputs.

Further referring to FIG. 5A, the order menu 510 may include a men description of "Order menu." The order menu 510 may comprise three menu options. The first menu option may be an endpoint of "Place Order" 511, the second menu option may be an endpoint of "Order Status" 512 and the third menu option may be an endpoint of "Cancel Order" 513. When the first menu option is selected, the automated system may present a caller-specific input message, such as "Say or press the item number, followed by the pound sign." When the second or the third menu option is selected, the automated system may present a message indicating a caller-specific input, such as "Say or press the order number now and press then pound key." Semantic and/or syntactic analysis of the message may determine that the message is indicating a caller-specific input and is thus an endpoint.

FIG. 5B is a block diagram illustrating a lookup table structure. The lookup table 550 illustrated corresponds to the tree structure illustrated in FIG. 5A. The lookup table may include one or more entries, each entry corresponding to an endpoint of the automated system. The entries may be inserted as the tree structure is mapped out. An entry may include a sequence of inputs and an endpoint description. The sequence of inputs may include one or more inputs to the automated system, which when sequentially used at each menu presented, may navigate the automated system to the specified endpoint. The sequence of inputs may comprise one or more inputs, and an input may comprise a DTMF signal or a pause (i.e. an absence of a signal) for a short period of time. The short period of time may be determined by listening when the automated system presents the next menu. An input of pause may be indicated in the sequence of inputs by an escape character, an identifier, etc. that specifies the pause and/or the length of the short pause. The endpoint description may be from the corresponding menu description or the corresponding menu option description from the menu tree.

Further referring to FIG. 5B, the lookup table 550 includes five entries. The first entry includes a sequence of inputs "<pause>,1,1" 522, and a menu description of "Place Order." 562. The first entry corresponds to the endpoint of Place Order menu node 511 in FIG. 5A. The sequence of inputs "<pause>, 1,1" may navigate the automated system. The first input of "<pause>" may navigate the automated system from the Language menu to the Main menu in English, and the second input of "1" may navigate to the Order Menu. The third input of "1" may then navigate to the "Place Order" menu. The other four entries may similarly include sequence of inputs 554, 556, 558, and 560, and corresponding endpoint descriptions 564, 566, 568, and 570.

Figure 6A:
FIG. 6A is an illustrative content item displayed with a phone number according to a described implementation.

FIG. 6A is an illustrative content item 600 displayed with a phone number 610. The phone number 610 may be a content item provider's phone number. The content item 600 may be provided to a client device for display on a search engine result page, on a first-party web page, in a mobile application, etc. The number may be dialed on a mobile device, a landline, or any other device. The call will be connected directly with an automated system provided by the content item provider, and the caller must navigate the automated system.

Figure 6B:
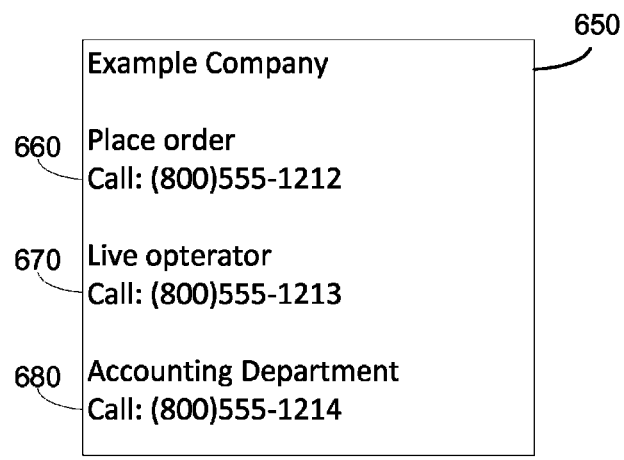
FIG. 6B is an illustrative content item displayed with associated strings according to a described implementation.

FIG. 6B is an illustrative content item 650 displayed with generated strings. The content item from FIG. 6A may be provided for display on a client device with one or more second phone numbers 660, 670 and 680. Each of the second phone number may correspond to an endpoint in the lookup table. The second phone number may be displayed with an endpoint description of the endpoint, which may be a menu description or a menu option description. First instance, one of the second phone numbers 660 may correspond to an endpoint that includes the endpoint description "Place Order" 562 in the lookup table 550 of FIG. 5B. Another second phone number 670 may correspond to an endpoint that includes the endpoint description "Live Operator" 568 in FIG. 5B. Yet another second phone number 680 may correspond to an endpoint that includes the endpoint description "Accounting Department" 570 in FIG. 5B. The second phone numbers may be received from a pool of available phone numbers and marked such that a caller calling a second phone number will be forwarded to the content item provider's phone number 610 of FIG. 6A, with the sequence of inputs in the lookup table 550 of FIG. 5B. The caller will be directly to the endpoint and will not need to navigate the automated system.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for instance, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for instance, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

Thus, particular implementations of the subject matter have been described. Other implementations are within the scope of the following claims. In some cases, the actions recited in the claims can be performed in a different order and still achieve desirable results. In addition, the methods depicted in the accompanying figures do not necessarily require the particular order shown, or sequential order, to achieve desirable results. In certain implementations, multitasking and parallel processing may be advantageous.

What is claimed is:

1. A computer-implemented method of associating strings with content items, the method comprising:
   receiving, by a receiver of a content item management system, a content item from a computing device of a third-party content provider, the receiver comprising a wired or wireless communication interface;
   obtaining, by a processor of the content item management system, a phone number from the content item, the phone number associated with the third-party content provider;
   contacting, by the processor, the third-party content provider by calling the phone number;
   analyzing, by the processor, an initial message to verify that, by calling the phone number, a connection was made to an automated system comprising a menu tree;
   determining, by the processor, an endpoint of the automated system by listening to a message from the automated system, sending an input to the automated system, and receiving an indication of an endpoint of the menu tree;
   generating, by the processor, a string comprising the phone number and the input associated with the endpoint;
   associating, by the processor, the string and a description of the endpoint with the content item; and
   providing, by the processor, the content item with the string for display at a client device.

2. The method of claim 1, wherein generating the string comprises appending the string with a second input required to reach the endpoint.

3. The method of claim 1, wherein associating the string comprises:
   selecting a second phone number from a pool of phone numbers;
   linking the second phone number with the string; and
   associating the second phone number with the content item.

4. The method of claim 1, wherein determining the endpoint comprises:
   building a representation of the menu tree comprising a menu;
   storing, in a lookup table, the endpoint with an endpoint description and a sequence of inputs required to reach the endpoint; and
   selecting the endpoint from the lookup table based on the endpoint description.

5. The method of claim 4, wherein:
   building the representation of the menu tree comprises:
      receiving a message associated with the menu;
      parsing the message into one or more segments, each segment presenting a description or a menu option;
      generating, from each segment, a corresponding menu description or a menu option description;
      updating the representation of the menu tree by one of inserting or updating a menu node in the representation of the menu tree, the menu node comprising the menu description or the menu option description; and
      determining that the menu node or the menu option is an endpoint; and
   storing an endpoint comprises:
      storing, in the lookup table, the determined endpoint comprising the menu description or the menu option description, and a sequence of inputs generated from the menu tree.

6. The method of claim 4, comprising:
   rebuilding the lookup table responsive to one of an expiration of a predetermined period of time, the content item reaching a predetermined performance metric, or a request by the computing device of third-party content item provider.

7. The method of claim 1, comprising:
   inferring information about the third-party content item provider from the endpoint.

8. The method of claim 1, wherein determining the endpoint comprises detecting one of:
   a ringtone;
   a live operator;
   a message indicating an endpoint;

a menu option to be transferred to a specific department;
a menu option to navigate back to a previous menu; or
a dial tone.

9. The method of claim 1, wherein the input comprises one of a dual-tone multi-frequency signal, a pause, a speech recording, or a speech synthesis.

10. A computer-implemented system for associating strings with content items, the system comprising one or more processors in communication with a receiver, an extractor, a caller, a call verifier, an endpoint detector, a string generator, a linker, and a content item selector, the system configured to:
receive, via the receiver, a content item from a computing device of a third-party content provider, the receiver comprising a wired or wireless communication interface;
obtain, via the extractor, a phone number from the content item, the phone number associated with the third-party content provider;
contact, via the caller, the third-party content provider via the phone number;
analyze, via the call verifier, an initial message to verify that, based on a call to the phone number, a connection was made to an automated system comprising a menu tree;
determine, via the endpoint detector, an endpoint of the automated system from an evaluation of a message from the automated system including an input sent to the automated system, and an indication of an endpoint of the menu tree received from the automated system;
generate, via the string generator, a string comprising the phone number and the input associated with the endpoint;
associating via the linker, the string and a description of the endpoint with the content item; and
provide, via the content item selector, the content item with the string for display at a client device.

11. The system of claim 10, comprising the string generator configured to generate the string by appending the string with a second input required to reach the endpoint.

12. The system of claim 10, comprising the linker configured to:
select a second phone number from a pool of phone numbers;
link the second phone number with the string; and
associate the second phone number with the content item.

13. The system of claim 10, comprising:
the one or more processors configured to:
build a representation of the menu tree comprising a menu; and
memory configured to store the endpoint with an endpoint description and a sequence of inputs required to reach the endpoint; wherein
the string generator selects, the endpoint from a lookup table based on an endpoint description.

14. The system of claim 13, comprising a the menu builder configured to:
receive a message associated with the menu;
parse the message into one or more segments, wherein each segment presents a description or a menu option;
generate, from each segment, a corresponding menu description or a menu option description;
update the representation of the menu tree by one of inserting or updating a menu node in the representation of the menu tree, the menu node comprising the menu description or the menu option description; and
determine that the menu node or the menu option is an endpoint; and
store, in the lookup table, the determined endpoint comprising the menu description or the menu option description, and a sequence of inputs generated from the menu tree.

15. The system of claim 13, the menu builder configured to rebuild the lookup table responsive to one of an expiration of a predetermined period of time, the content item reaching a predetermined performance metric, or a request by the computing device of the third-party content item provider.

16. The system of claim 10, comprising a menu analyzer configured to infer information about the third-party content item provider from the endpoint.

17. The system of claim 10, comprising the endpoint detector configured to detect one of:
a ringtone;
a live operator;
a message indicating an endpoint;
a menu option to be transferred to a specific department;
a menu option to navigate back to a previous menu; or
a dial tone.

18. The system of claim 10, wherein the input comprises one of a dual-tone multi-frequency signal, a pause, a speech recording, or a speech synthesis.

* * * * *